(12) United States Patent
Brown et al.

(10) Patent No.: US 8,429,236 B2
(45) Date of Patent: Apr. 23, 2013

(54) TRANSMISSION OF STATUS UPDATES RESPONSIVE TO STATUS OF RECIPIENT APPLICATION

(75) Inventors: Michael S. Brown, Waterloo (CA); Gerhard D. Klassen, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 753 days.

(21) Appl. No.: 12/645,873

(22) Filed: Dec. 23, 2009

(65) Prior Publication Data

US 2010/0262664 A1    Oct. 14, 2010

Related U.S. Application Data

(60) Provisional application No. 61/167,772, filed on Apr. 8, 2009.

(51) Int. Cl.
G06F 15/16 (2006.01)
G06F 12/00 (2006.01)

(52) U.S. Cl.
USPC .......................................... 709/206; 709/207

(58) Field of Classification Search .......... 709/206–207, 709/223–229, 250
See application file for complete search history.

(56) References Cited

U.S. PATENT DOCUMENTS

| | | | | |
|---|---|---|---|---|
| 5,974,559 | A | * | 10/1999 | Bannai ........................... 713/330 |
| 6,134,446 | A | | 10/2000 | Sasuta et al. |
| 7,403,972 | B1 | * | 7/2008 | Lau et al. ....................... 709/206 |
| 2001/0005859 | A1 | * | 6/2001 | Okuyama et al. .............. 709/245 |
| 2003/0027571 | A1 | | 2/2003 | Karlsson et al. |
| 2004/0198354 | A1 | * | 10/2004 | Pettine, Jr. .................. 455/435.1 |
| 2005/0054344 | A1 | * | 3/2005 | Jung et al. ................... 455/432.3 |
| 2005/0083902 | A1 | * | 4/2005 | Hashimoto .................... 370/349 |
| 2006/0194598 | A1 | * | 8/2006 | Kim et al. ...................... 455/509 |

FOREIGN PATENT DOCUMENTS

| | | |
|---|---|---|
| EP | 1471695 A1 | 10/2004 |
| WO | 03/019319 A2 | 3/2003 |

OTHER PUBLICATIONS

Harrysson, Andreas, Extended European Search Report, Apr. 20, 2010, Munich, Germany.
EP10151178.0-2412, Extended European Search Report, Jun. 8, 2010, Munich Germany.

* cited by examiner

*Primary Examiner* — Zarni Maung
(74) *Attorney, Agent, or Firm* — Trop Pruner & Hu, P.C.

(57) ABSTRACT

Selecting and modifying the transmission rates and sizes of status update messages transmitted by a mobile communications device to a recipient application based on use of the updates by the recipient application improves resource utilization or accuracy. During one mode of operation, a mobile communications device transmits status messages using a conservative message transmission mode. This allows the mobile communications device to transmit a greater number of status updates for future processing by the recipient application while conserving resources. When the recipient application is actively processing status updates from the mobile communications device, the mobile communications device transmits the status messages using an accelerated message transmission mode with a different number of status updates in each status message and different delay between status messages, which may reduce delay or improve accuracy. Similarly, the mobile communications device may reduce the number of status updates transmitted by applying algorithm-based filters described herein based on the expected usage by the recipient application.

18 Claims, 12 Drawing Sheets

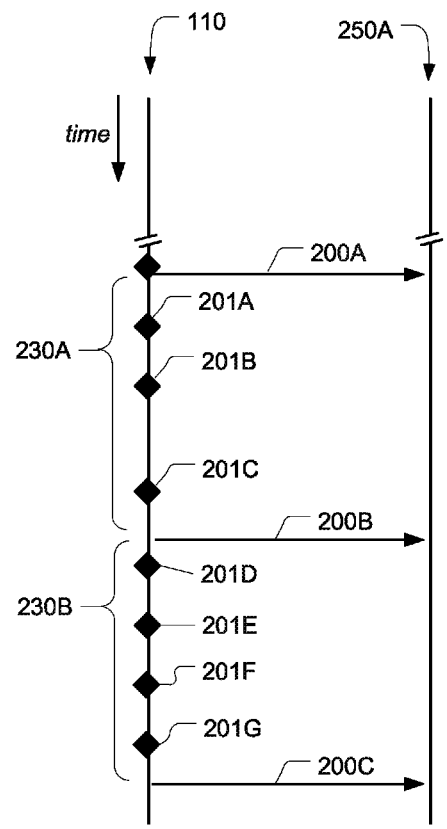 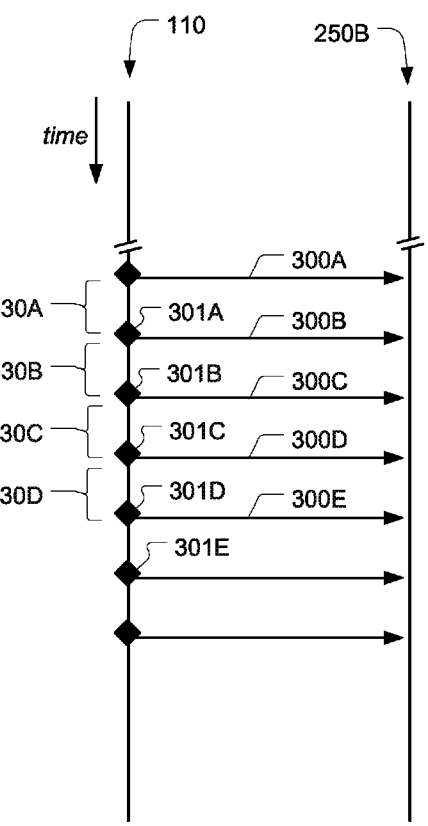
Conservative
Message Transmission Mode
Accelerated
Message Transmission Mode
Figure 2
Figure 3

TRANSMISSION OF STATUS UPDATES RESPONSIVE TO STATUS OF RECIPIENT APPLICATION

CROSS-REFERENCE TO RELATED APPLICATIONS

This disclosure claims the priority of U.S. Provisional Application No. 61/167,772, filed Apr. 8, 2009, the content of which is incorporated in its entirety herein.

BACKGROUND

The present application relates generally to status updates transmitted from a mobile communications device, and in particular to location updates transmitted from a mobile communications device to a recipient application.

While telephony in the past was limited to voice calls at fixed locales, modern mobile communications devices may be used in a variety of locations. Furthermore, modern mobile communications devices support a large variety of data-enabled applications, including applications that utilize data generated or collected at the mobile communications device. This may include, for example, applications that are aware of the location of the mobile communications device. Taking advantage of these capabilities, users of mobile communications devices are increasingly mobile and social.

Transmissions from the mobile communications device over a wireless communications system consume resources that would be desirable to conserve. This is especially true for a mobile communications device that consumes power when it is transmitting a signal. Each transmission from the mobile communications device consumes power from the battery on the device and utilizes a wireless communications channel during the transmission.

To conserve resources, a solution for efficient transmission of status updates from mobile communications devices would provide an advance in the field.

BRIEF DESCRIPTION OF THE DRAWINGS

The disclosure will be more clearly understood by reference to the following detailed description of example embodiments and in conjunction with the accompanying drawings by way of illustration. In the drawings, like numerals describe substantially similar components throughout the several views.

FIG. 2 is a sequence diagram wherein a mobile communications device is generating status updates and transmitting status messages to a non-active recipient application using a conservative message transmission mode in accordance with at least one of the embodiments described in this disclosure.

FIG. 3 is a sequence diagram wherein a mobile communications device is generating status updates and transmitting status messages to a recipient application that is actively processing status updates and the mobile communications device is transmitting status messages using an accelerated message transmission mode in accordance with at least one of the embodiments described in this disclosure.

DETAILED DESCRIPTION

Figure 1:
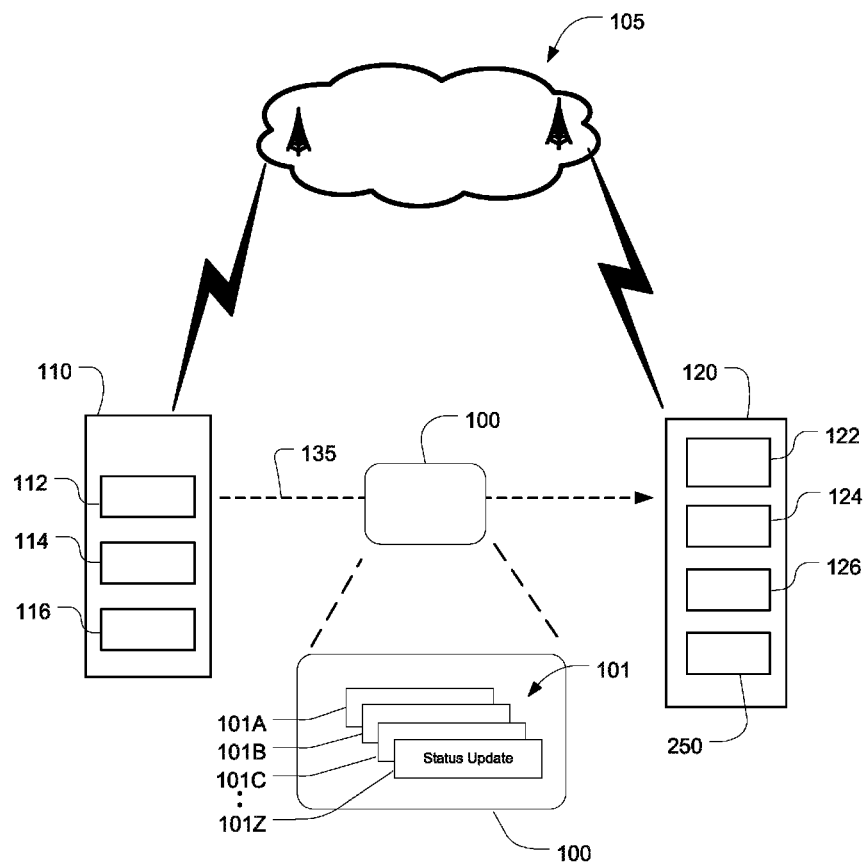
FIG. 1 is a diagram illustrating a system in which a mobile communications device is transmitting status messages to a recipient application over a wireless communications network in accordance with at least one of the embodiments described in this disclosure.

Modern mobile communications devices may have the capability of collecting or generating information. This information may be included in a status update, where each status update has information that has been collected or generated since the previous status update. A mobile communications device may be configured to generate or collect a plurality of status updates during a period of time, and include the plurality of status updates in a status message transmitted over a wireless network to a recipient application.

A recipient application may be any software, hardware, component, or collection of components that processes status updates from a mobile communications device and generates an output based on the status updates. A recipient application that is producing an output around the same time that it is processing the status updates is said to be actively processing the status updates. This might also be called real-time, near real-time, concurrently processing, or other terms understood by a person of skill in the art to mean that the recipient application is processing the status updates to produce an output based on the status updates soon after receiving the status updates. A recipient application that is not actively processing status updates to generate an output is also called a "non-active recipient application" in this disclosure. The non-active recipient application may be, for example, an application running as a background process, an idle application, or a recipient application that is not launched, or any other component that is not producing an output soon after receiving the status updates.

This disclosure describes arrangements which enable a mobile communications device to transmit status updates efficiently over a wireless network to a recipient application. In one solution, the mobile communications device utilizes different message transmission modes based on the activity of the recipient application—i.e., whether or not the recipient application is actively processing status updates. The different message transmission modes may implement different amounts of delay between status messages and number of the status updates included in each status message. In one implementation, the mobile communications device may automatically select a different message transmission mode when the mobile communications device determines that the recipient application is actively processing status updates. By selecting between different message transmission modes, the mobile communications device is able to conserve resources during times when the recipient application is not actively processing the status updates. This disclosure also describes several ways in which the mobile communications device may determine that the recipient application is actively processing status updates. In various embodiments, the mobile communications device determines whether the recipient application is actively processing or not actively processing by one or more of: observing an indication in a synchronized database; receiving an unsolicited request message from the recipient application; receiving an unsolicited indication from an infrastructure element; soliciting and receiving an indication from the recipient application; or soliciting and receiving an indication from an infrastructure element. Moreover, in some embodiments, the mobile communications device may determine that the recipient application is not actively processing after a defined period has elapsed since the most recent indication that the recipient application is actively processing was received. In some embodiments, the mobile communications device may use a timestamp in a synchronized database, request message or indication to determine if the recipient application is actively processing status updates.

This disclosure also describes arrangements which enable a mobile communications device to reduce the number of status updates transmitted to a recipient application by applying algorithm-based filters based on the expected usage by the recipient application. By using the algorithm-based filters described in this disclosure, the mobile communications device may discard a portion of status updates and reduce the number of status updates to include in a status message. This efficiently conserves resources that would otherwise be used to transmit discarded status updates over a wireless network.

As seen in the accompanying Figures, the present disclosure describes an arrangement by which the mobile communications device may provide a plurality of status updates for a recipient application while automatically selecting between different message transmission modes depending on the status of the recipient application. In a conservative message transmission mode, the mobile communications device may conserve resources by increasing the delay between status messages and by increasing the number of status updates in each status message. As a non-limiting example, the conservative message transmission mode may be useful when a non-active recipient application will process status updates at some point in the future for historical status. During the times when a recipient application is actively processing the status updates for greater accuracy of current status, the mobile communications device may operate in an accelerated message transmission mode. The accelerated message transmission mode may have less delay between transmissions of status messages and may include fewer status updates in each status message. As a non-limiting example, a status message in the accelerated message transmission mode might include only one status update.

For some recipient applications, the recipient application is capable of generating a more useful output when the recipient application has a large number of status updates to process. For example, the recipient application may have improved accuracy, granularity, or reliability when the recipient application has a large number of measured data points available to process. Some examples of these recipient applications may include, without limitation, Supervisory Control And Data Acquisition (SCADA) systems, location applications, presence applications, weather applications, and predictive model applications. A non-active recipient application that will process status updates at some point in the future may use collected status updates to determine historical status. By increasing the delay between status messages and including more status updates in each status message, the conservative message transmission mode provides a greater number of status updates (than might otherwise be available at a selected status message transmission rate) for improved accuracy of historical status, while conserving resources. But when a recipient application is actively processing status updates (e.g., in "near real-time") it is desirable for a mobile communications device to send status updates to a recipient application with less delay. Thus, when the recipient application is actively processing status updates, the mobile communications device may transmit status messages using the accelerated message transmission mode.

One type of recipient application, used as an example in this disclosure, is a location application that processes location updates from a mobile communications device. Examples of location applications may include a mapping application, tracking application, or reporting application. For example, when used as a mapping application, the location application may generate an output comprising a map displayed on a screen that shows the current location, and optionally, the historical location, of a moving device. This type of recipient application may be used in a variety of situations, e.g., police may track the location of squad cars, distribution companies may track the whereabouts of delivery vehicles, businesses or government agencies may track the location of mobile employees, or parents may track the location of children.

For one purpose, a location application may be used to display the location history of a mobile communications device. The location application may provide a better granularity regarding the location history of a mobile communications device when the location application has a large number of historical location updates to process. For example, the location application may display a map showing a "breadcrumb trail" representing the location history of a device. Typically, the location application would plot each data point, such as a longitude and latitude, on a map. In some implementations, a line may be drawn connecting the data points to infer the expected location for areas not directly measured or reported. When there are a greater number of data points, the breadcrumb trail may have greater accuracy or more extensive history in relation to the map. When there are fewer data points to render on the map, the breadcrumb trail may not be accurate in relation to the roads or other items on the map, or the map may display a less extensive breadcrumb trail. For example, the breadcrumb trail may incorrectly appear to go through buildings or obstacles on the map because the smaller number of data points less accurately represents the actual path of the device. Similarly, if a location application is used to calculate historical velocity for a moving device, a large number of time-stamped location measurements may provide a more accurate determination the velocity. For these purposes, it is desirable to have a large number of location measurements available for the location application to process.

But for another purpose, a location application may be used to display the current location of a mobile communications device. The location application may provide better accuracy regarding the current location of a mobile communications device when the location application receives location updates with less delay. In this case, it is desirable to decrease the delay between the measurement of a data point to be furnished in a status update and the time when the recipient application processes the status update. By decreasing the delay between status messages, the location application may output the current location of the mobile communications device with increased accuracy to the user of the recipient application, such as the police dispatcher, employer, or parent using a location application to track the current location of a device.

The present disclosure relates to mobile communications systems, which may be implemented using a variety of electronic and optical technologies, including but not limited to: analog electronic systems; digital electronic systems; microprocessors and other processing elements; and software and otherwise embodied collections of steps, instructions, and the like, for implementing methods, processes, or policies in conjunction with such systems and processing elements. It will be appreciated that in the relevant arts, various signal leads, busses, data paths, data structures, channels, buffers, message-passing interfaces, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures.

FIG. 1 depicts an example embodiment of a communications system 160 in which aspects of the present disclosure may be implemented. As best seen in FIG. 1, system 160 includes a mobile communications device 110 adapted to transmit (as shown by arrow 135) a status message 100 over a wireless communications network 105 to a recipient application 250 running on a recipient mobile communications device 120. Status message 100 is an instance of one status message sent in a sequence of status messages. Status messages, such as status message 100, may contain a plurality of status updates 101 such as status updates 101A, 101B, 101C and 101Z. Although four status updates 101A, 101B, 101C and 101Z are shown, instances of status message 100 may contain any suitable number of status updates, including one.

The recipient application 250 may for example (but without limitation) be a location application. In that case, each status update 101A, 101B, 101C, and 101Z may be a location update and may comprise, for example, any one or more of a longitude, latitude, relative position, absolute position, altitude, velocity, timestamp, or other location information collected by a location module in the mobile communications device 110. Recipient application 250 could also be an application unrelated to location, in which case mobile communications device 110 could send, and recipient application 250 could receive, any suitable status updates of a general nature. Further, mobile communications device 110 could send status updates containing a mixture or combination of location-related information and general information. Moreover, mobile communications device 110 could send a mixture of status updates, some comprising location information and others comprising information of a general nature. Recipient application 250 could receive the any of these status updates and select for processing those updates relevant to the recipient application.

Figure 13:
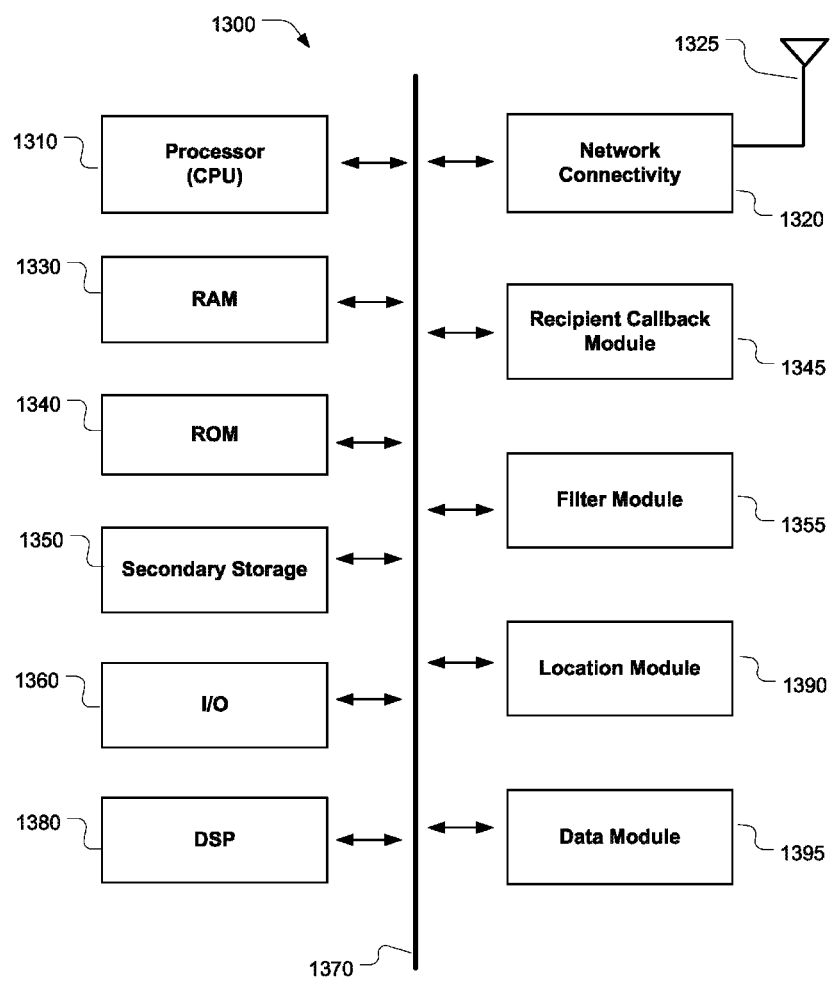
FIG. 13 is a diagram illustrating a processor and related components suitable for implementing at least one of the embodiments described in this disclosure.

Mobile communications device 110 may take the general form of mobile communications device 1300 as described further in connection with FIG. 13. In an example embodiment, mobile communications device 110 may further comprise a message generator 112, a mode selector 114, and a status update assembler 116. The status update assembler 116 may, for example, comprise a location module, data module, or other module operative to generate or collect status updates at the mobile communications device 110. The status update assembler 116 may also comprise a filter module according to another aspect of this disclosure, wherein the filter module may discard or select for use status updates using algorithm-based filters based on the expected usage of the status update. The mode selector 114 may be any component operable to determine whether the recipient application 250 is actively processing status updates from mobile communications device 110 in accordance with this disclosure and to select a message transmission mode. The mode selector 114 may, for example, comprise a recipient callback module, timer, components to observe a local database, components to inspect a request message from a recipient application, components to compare a timestamp with the local time of the mobile communications device 110, or other modules operable to determine whether the recipient application is actively processing status updates from mobile communications device 110 in accordance with this disclosure. The message generator 112, responsive to the mode selector 114, is operable to generate status messages comprising status updates and cause the status messages to be transmitted to recipient application 250 using the selected message transmission mode.

Recipient mobile communications device 120 may take the general form of mobile communications device 1300 as described further in connection with FIG. 13. The recipient mobile communications device 120 may comprise one or more components as described further in connection with FIG. 13, such as one or more processors, memory, network connectivity, and input/output (including, but not limited to a display). The recipient application 250 may be executed using one or more of these components such that it is capable of receiving status updates 101A, 101B, 101C and 101Z in status message 100 from mobile communications device 110. In some embodiments, the recipient application 250 or the recipient mobile communications device 120 may further comprise components such as a status message processor 122, a status update processor 124, and a display 126. If present, the status message processor 122 may receive status messages from mobile communications device 110 and provide the status updates included in each status message to the status update processor 124. The status update processor 124 may operate as part of the recipient application 250 and may be operable to indicate that recipient application 250 is actively processing status updates. As a non-limiting example, status update processor 124 may comprise a database record generator, a request message generator, a timestamp generator, or any other component operable to indicate that the recipient application 250 is actively processing status updates in accordance with this disclosure. The recipient application 250 may generate an output based on the status updates and send the output to the display 126, if present. It is understood that the recipient application 250 may generate other types of output, not limited to visual output sent to a display 126.

As best seen in FIG. 1, in an example embodiment according to an aspect of this disclosure, recipient application 250 is located on recipient mobile communications device 120. In other embodiments, recipient application 250 may be located on any suitable machine or machines operatively connected to the wireless communications network 105. For example, the recipient application 250 may exist in one or more servers, one or more mobile communications devices, a personal computer, or a combination of one or more machines operable to run components of a recipient application 250.

According to an aspect of this disclosure, in one state of operation, recipient application 250 may be actively processing the status updates. Recipient application 250 is said to be actively processing status updates when it is generating an output based on the status updates soon after receiving the status updates. In another state of operation, recipient application 250 may be a "non-active recipient application" and may generate an output at some point in the future based on the collected status updates. For purposes of this disclosure, a recipient application 250 that is simply collecting and storing the status updates without producing an output soon thereafter is not actively processing the status updates and is called a non-active recipient application. For example, in a one state of operation, the non-active recipient application 250 may collect the status updates 101 from the status message 100 and store the status updates 101 for later use by the recipient application 250. Alternatively, a non-active recipient application 250 could operate in a mode in which it ignores or discards the status message 100 or the status updates 101. For another example, a non-active recipient application 250 may be stored on recipient mobile communications device 120 but exist in an inactive or non-executing state. In that example, the status message 100 or status updates 101 may be ignored or discarded by recipient mobile communications device 120 until a time when a recipient application 250 is executed and is actively processing the status updates to generate an output. In yet another example, the recipient application 250 might store status message 100 in a buffer, queue, or similar storage facility until the recipient application 250 enters an active state.

In some implementations a recipient application 250 may comprise two or more application components that are associated with each other, such as a collector component and an output component. The collector component may be used to receive and store the status updates without actively processing the status updates to generate an output, and the output component may be used to generate the output. Regardless of whether the collector component and the output component are executed by the same machine or by different machines, they are referenced together as a recipient application 250 in this disclosure. The recipient application 250 is said to be actively processing the status updates when the output component of the recipient application 250 is actively processing status updates to generate an output around the same time that any component of the recipient application 250 is receiving the status updates. If the output component of a recipient application 250 is not generating an output around the same time that the status updates are received then the recipient application 250 is a non-active recipient application, regardless of whether the collector component is collecting and storing the status updates.

When recipient application 250 is actively processing the status updates 101, recipient application 250 generates an output based on the status updates 101. The generated output may be, for example but without limitation, an image on a screen, display, or monitor, a printout from a printer or plotter, the activation of an indicator lamp, LED, or other indicia, audible output such as voice synthesis or audible tones, mechanical vibration or a similar tactile indication, or any other output which can be visually, audibly, or otherwise sensed or understood by a user of the recipient application 250. In some embodiments, the recipient application 250 may generate the output based on the information included in the status updates 101 without including the information in the output. In other embodiments, the generated output may comprise information in the status updates 101 sent to an output device. In FIG. 1, when the recipient application 250 is actively processing the status updates it may generate an output on the screen or display of the recipient mobile communications device 120. In the case where the recipient application 250 represents a location application, the output may comprise a map showing the current and historical location of mobile communications device 110 on the screen or display of the recipient mobile communication device 120. These are merely examples of the form in which an output may be presented or conveyed to a user; one of skill in the art will appreciate that other forms of output may also be used without departing from the scope of the present disclosure.

Mobile communications device 110 may be capable of transmitting status messages using different message transmission modes. A conservative message transmission mode may be used when the recipient application 250 is a non-active recipient application. An accelerated message transmission mode may be used when recipient application 250 is actively processing the status updates. Mobile communications device 110 may determine that the recipient application 250 is actively processing status updates, for example, using one or more of the solutions described further in this disclosure. In some implementations, the mobile communications device 110 may automatically select the accelerated message transmission mode in response to determining that the recipient application is actively processing the status updates. Subsequently, mobile communications device 110 may automatically resume transmitting status messages using the conservative message transmission mode after determining that the recipient application is no longer actively processing status updates.

The different message transmission modes may employ different amounts of delay between status messages and may employ different numbers of the status updates included in each status message. A person skilled in the art will appreciate that the delay between status messages might be described using terms such as message rate, frequency of the status messages, message delay, or message interval. A lower amount of delay between each status message would represent a faster message rate, while a greater amount of delay between each status message represents a slower message rate. One skilled in the art will appreciate that the delay between status messages is not necessarily the same as delay between status updates (which may be described as a status update rate or measurement frequency). For example, in some implementations, status updates may be created by the location module or data module of the mobile communications device 110 at a predetermined rate (status update rate), such as one status update every 30 seconds. For a mobile communications device 110 to transmit all status updates generated at the status update rate, it may transmit status messages using a conservative message transmission mode which may comprise one status message per hour (3600 seconds), where each status message comprises one-hundred twenty (120) status updates. To report the same number of status updates (120 total status updates per hour), the mobile communications device 110 may utilize an accelerated message transmission mode which may comprise one status message per thirty seconds where each status message comprises one status update. In this example, the conservative message transmission mode and accelerated message transmission mode may provide the same overall number of status updates to a recipient application 250. However, the mobile communications device 110 may generate status updates or status messages at other-than-fixed or -predetermined frequencies or intervals; the example described above is offered to describe the difference between a status update rate and the frequency of status messages.

A message transmission mode may be described by the amount of delay between status messages, the number of status updates in each status message, or by various other variables that control the transmission of status messages. Available status updates may be compiled into status messages according various schemes, depending on which a first example status message may contain one status update, or a second example status message may contain a plurality of status updates. In an embodiment, as status updates are generated, they are compiled into a single status message, until transmission of the status message is triggered or enabled in accordance with the message transmission mode; thereafter, subsequent status updates are compiled into a new message. In each message transmission mode, transmission of the status message may be triggered or enabled by the occurrence of a specific time, or by elapsed time, or by the expiration of a timer, or when the number of status updates present in the message reaches a defined number, or when a number of defined events is counted, or by the instance of some other event. For example, each message transmission mode may employ a respective, perhaps different, predetermined delay between transmissions of status messages. Alternatively, the message transmission mode may require the generation or collection of a threshold number of status updates before transmission of a status message. The threshold number of status updates to include in each status message may be a minimum or a maximum threshold limit. Alternatively, the message transmission mode may have a predetermined number of status updates and a predetermined delay between status messages and may transmit a status message only when one or both of these predetermined limits are reached. A person skilled in the art will appreciate other variations which may define a conservative message transmission mode and an accelerated message transmission mode.

A conservative message transmission mode is desirable, for example, when the recipient application 250 is not actively processing the status updates, so that the mobile communications device 110 may conserve resources while nonetheless allowing the recipient application (that is not actively processing status updates) to generate an output in the future based on the status updates. FIG. 2 is a sequence diagram illustrating mobile communications device 110 transmitting status updates using a conservative message transmission mode. In FIG. 2, recipient application 250 is not actively processing status updates, and therefore appears as a non-active recipient application 250A. Mobile communications device 110 is generating status updates 201, for example 201A, 201B, 201C, 201D, 201E, 201F, and 201G. Status updates may be generated at predetermined regular time intervals or may be generated irregularly, such as upon the occurrence of a triggering event or during a random time interval. Additionally, status updates may be discarded or filtered using algorithm-based filters further described in connection with FIG. 11.

In the conservative message transmission mode of FIG. 2, the delay between status messages, such as status messages 200A, 200B, and 200C, is represented by reference numerals 230A and 230B. After transmission of status message 200A, the mobile communications device will delay for a period of time 230A before transmitting the next status message 200B. During the delay 230A, the mobile communications device has generated or collected a plurality of status updates 201A, 201B, and 201C. When mobile communications device 110 transmits status message 200B, status message 200B comprises status updates 201A, 201B, and 201C. Although three status updates 201A, 201B, and 201C are shown in this diagram, instances of status message 200 may contain any suitable number of status updates generated or collected during the delay 230A. During the delay 230B, the mobile communications device has generated or collected a plurality of status updates 201D, 201E, 201F, and 201G, which will be included in the transmission of status message 200C.

In FIG. 2, each status message 200A, 200B, and 200C is representative of a status message 100 and status updates 201A, 201B, 201C, 201D, 201E, 201F, 201G are representative of status updates 101. By including a plurality of status updates in each status message, the mobile communications device 110 may transmit status messages less frequently, conserving resources. As a result of using the conservative message transmission mode, a greater number of status updates can be made available to a recipient application than would be available if only one status update were transmitted in a status message, enabling for more extensive historical status information to be used by the recipient application 250A when it later processes the status updates.

When a recipient application 250 is actively processing status updates it may be desirable for the mobile communications device 110 to transmit status messages using the accelerated message transmission mode. FIG. 3 illustrates the mobile communications device 110 transmitting status messages, such as status messages 300A, 300B, 300C, 300D and 300E to a recipient application 250B that is actively processing the status updates to generate an output based on the status updates. The delay between status messages is represented by reference numerals 330A, 330B, 330C, and 330D.

After transmitting a prior status message, the mobile communications device 110 generates or collects status update 301A. In this example, the delay 330A between the prior status message and status message 300A is about the same as the interval between the generation of status updates. In other examples, the delay 330 may be sufficient for more than one status update to be generated or collected during the delay. When status message 300A is transmitted, it includes status update 301A. Similarly, during the delay 330B, the mobile communications device 110 generates or collects status update 301B. After delay 330B, the mobile communications device 110 transmits status message 300B comprising status update 301B. Each status message 300A, 300B, 300C, 300D, and 300E in FIG. 3 is an instance of a generalized status message, such as the status message 100 described earlier in connection with FIG. 1. In FIG. 3, each status message 300 comprises a single status update 301 according to one implementation of the accelerated message transmission mode.

In general, status messages would be transmitted more frequently in accelerated message transmission mode than in the conservative message transmission mode. In an embodiment, the delay between status messages would be a shorter fixed interval in the conservative message transmission mode and a longer fixed interval in the accelerated message transmission mode. In an embodiment, the time between status messages may be variable in each mode, but on average taken over a plurality of status messages, the time between status messages in accelerated message transmission mode is shorter than the time between status messages in conservative message transmission mode. In an embodiment, in the accelerated message transmission mode, status messages would be transmitted at the same rate as status updates are generated, such that each status message contains one status update (e.g., status message 300B); while in conservative message transmission mode, status messages are transmitted less frequently than status updates are generated, such that at least some status messages contain more than one status updates (e.g., status message 200B), or such that the average number of status updates contained in status messages exceeds 1. In some embodiments, status updates (cf., status messages) may be generated at a rate which does not vary depending on the message transmission mode, while in other embodiments, status updates may be generated more frequently in accelerated message transmission mode than in conservative message transmission mode.

Figure 4:
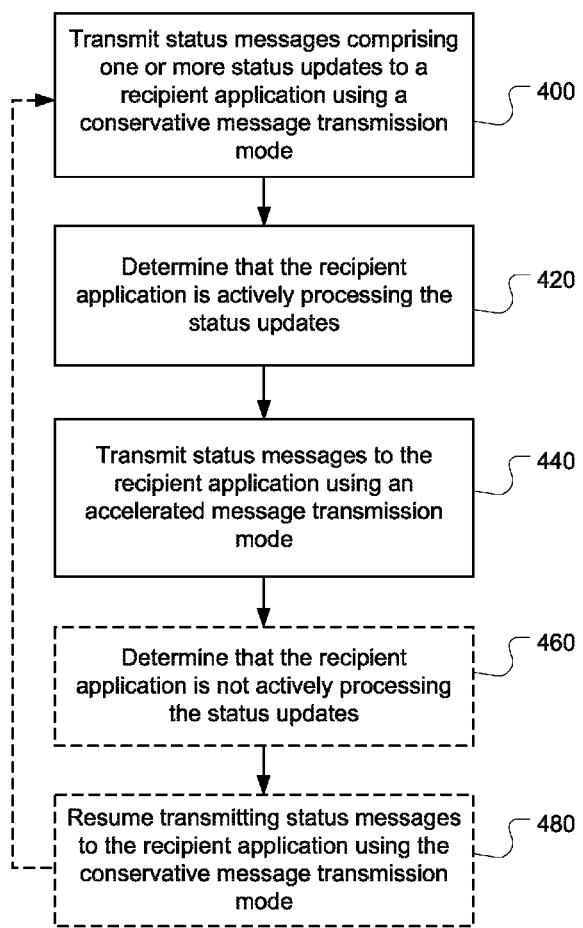
FIG. 4 is a flowchart illustrating a method of altering the message transmission mode of a mobile communications device based on the state of the recipient application in accordance with at least one of the embodiments described in this disclosure.

FIG. 4 is a flowchart illustrating an example method of altering the message transmission mode of a mobile communications device based on the state of the recipient application in accordance with at least one of the embodiments described in this disclosure. The steps or operations described herein are examples. There may be many variations to these steps or operations without departing from the scope of this disclosure. For instance, where appropriate, the steps may be performed in a differing order, or steps may be added, deleted, or modified. At step 400, the mobile communications device transmits status messages with one or more status updates to a recipient application using a conservative message transmission mode as generally shown in the example of FIG. 2. The status updates may be generated or collected by a status update assembler, such as status update assembler 116 of FIG. 1. The status update assembler 116 may comprise, for example, one or more of a location module, data module, or other module operative to generate or collect status updates at the mobile communications device. The mobile communications device may transmit status messages using a message generator, such as message generator 112 of FIG. 1, operable to generate status messages comprising status updates and cause the status messages to be transmitted to recipient application 250 using the selected message transmission mode.

At step 420, the mobile communications device determines that the recipient application is actively processing the status updates. This disclosure describes as non-limiting examples several ways that the mobile communications device may make this determination. In one embodiment described in connection with FIGS. 4-8, the mobile communications device utilizes a record in a database that indicates that a recipient application is actively processing status updates. In another embodiment, the mobile communications device may receive a request message as described in FIG. 10, where the request message comprises at least one of an indication that the recipient application is actively processing the status updates or an explicit request to transmit status messages using the accelerated message transmission mode. Other ways of making the determination could also be used. Upon determining that the recipient application is actively processing the status updates at step 420, the mobile communications device begins transmitting status messages to the recipient application at the accelerated message transmission mode at step 440. At step 460, the mobile communications device determines that the recipient application is not actively processing the status updates. At step 480, the mobile communications device resumes transmitting status messages to the recipient application at the conservative message transmission mode. Further variations of this method may use a timer at the mobile communications device to determine when to resume transmitting status messages to the recipient application at the conservative message transmission mode. In yet further variations, a time stamp may be used when determining whether the recipient application is actively processing status updates.

The mobile communications device may implement step 420 using a mode selector, such as the mode selector 114 of FIG. 1. The mode selector may be any component operable to determine whether the recipient application is actively processing status updates from mobile communications device in accordance with this disclosure and to select a message transmission mode. For example, but without limitation, the mode selector may comprise one or more of a recipient callback module, timer, components to observe a local database, components to inspect a request message from a recipient application, components to compare a timestamp with the local time of the mobile communications device, or other modules operable to determine whether the recipient application is actively processing status updates from mobile communications device in accordance with this disclosure. The mode selector may operate in conjunction with one or more processors, memory, a computing apparatus, or any components in the mobile communications device described in FIG. 13. The mode selector is capable of executing logic to determine that the recipient application is actively processing status updates in accordance with this disclosure. If present, the mode selector may provide an indication to the message generator to cause status messages to be sent using the accelerated message transmission mode.

Figure 5:
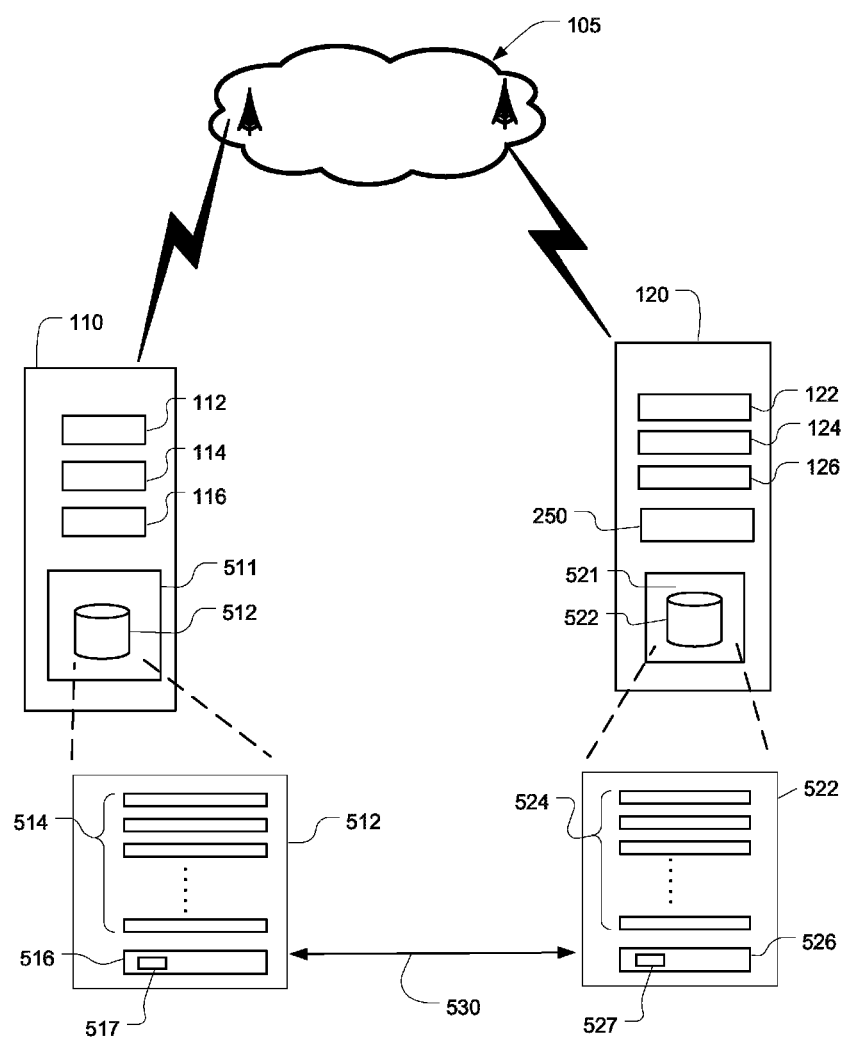
FIG. 5 is a diagram illustrating the use of a synchronized database to determine the state of the recipient application in accordance with at least one of the embodiments described in this disclosure.

FIG. 5 is a diagram illustrating an example embodiment of a system in which information concerning the processing state of the recipient application 250 of recipient mobile communications device 120 is made available in a database 512 (which may be a shared, replicated, or synchronized database) in the memory 511 of the mobile communications device 110. In this figure, mobile communications device 110 is a wirelessly connected mobile communications device transmitting status messages over a wireless communications network 105. The recipient application 250 in FIG. 5 may be, for example (but without limitation) a location application on a recipient mobile communications device 120. As noted previously, the recipient application 250 may be located on one or more machines, rather than a recipient mobile communications device 120. In FIG. 5, each mobile communications device comprises memory which is sufficient to store a database in each mobile communications device. Database 512 is stored in the memory 511 of mobile communications device 110. Database 522 is stored in the memory 521 of recipient mobile communications device 120. The databases 512, 522 are synchronized databases so that data records in database 512 are replicated duplicates of data records stored in database 522, and vice versa. For example, data records 514 in database 512 are duplicates of data records 524 on database 522.

In one embodiment of the system of FIG. 5, recipient mobile communications device 120 has a display 126 and a recipient application 250 (e.g., location application) capable of presenting or displaying on the display 126 a map showing the current location of mobile communications device 110. In other embodiments, the recipient application 250 generates an output which may be, for example but without limitation, an image on a screen, display, or monitor, a printout from a printer or plotter, the activation of an indicator lamp, LED, or other indicia, audible output such as voice synthesis or audible tones, mechanical vibration or a similar tactile indication, or any other output which can be visually, audibly, or otherwise sensed or understood by a user of the recipient application 250.

When recipient mobile communications device 120 is running the recipient application 250 in a such a way that recipient application 250 is actively processing the status updates from mobile communications device 110, the recipient application 250 adds a data record 526 to the database 522 which indicates that it is actively processing the status updates from mobile communications device 110. For example, the data record may comprise an identifier of the mobile communications device 110 and an indication that recipient mobile communications device 120 is actively processing the current location of mobile communications device 110. The recipient application 250 may utilize a status update processor, such as status update processor 124 or other component to add the data record 526 to the database 522. In some embodiments, the data record 526 may also comprise additional information, such as (but not limited to) a timestamp 527 indicating when the recipient application 250 began actively processing the status updates.

When the data record 526 is added to database 522, a database synchronizer 530 adds the corresponding data record 516 to database 512. The database synchronizer 530 may be implemented as any protocol, process, program, state machine, or the like, including a database synchronization process, which allows mobile communications device 110 and recipient mobile communications device 120 to maintain synchronized databases 512 and 522 respectively. Some examples of information exchange protocols (or elements thereof) by which database synchronizer 530 may operate include: an SMS message carrying database updates, an email message with database updates, a network protocol used for database updates. In some implementations, the database synchronizer 530 employs database update messages sent through a message exchange service, such as a peer-to-peer server that operates in the wireless communications network 105 to retransmit database update messages to each mobile communications device maintaining a synchronized database. For example, when data record 526 is added to database 522, recipient mobile communications device 120 may send a database update message to a network based centralized relay server which retransmits the database update message to mobile communications device 110. The database synchronizer 530 may be initiated at a regular time interval or upon any change in any synchronized database.

After the database synchronizer 530 causes the data record 526 to be added as data record 516 to database 512, mobile communications device 110 notices the data record 516 added to database 512 and determines that the recipient application 250 is actively processing status updates from mobile communications device 110. Upon making this determination, mobile communications device 110 transmits status messages at an accelerated message transmission mode that is different from the conservative message transmission mode.

In variations of this embodiment, the data record 516 may comprise additional information. For example, the data record 516 may specify a preferred message transmission mode to use for the accelerated message transmission mode. The data record 516 may comprise an explicit request to receive status messages using the accelerated message transmission mode, a duration specifying how long the recipient application requests the accelerated message transmission mode, or a timestamp indicating when the recipient application began actively processing the status updates. As a non-limiting example, the additional information may be a timestamp 517. Alternatively, the data record 516 may specify a selection among several predefined modes having different delays or thresholds.

In the case where database synchronizer 530 is initiated automatically whenever a change occurs to a synchronized database 512, 522, mobile communications device 110 may utilize the database update messages created by database synchronizer 530 as status messages. For example, the mobile communications device 110 may store one or more status updates in the memory 511 of the mobile communications device until a time when it must send a status message according to the current message transmission mode. At that time, mobile communications device 110 stores the one or more status updates in database 512, which causes a database update message to be sent to recipient mobile communications device 120 using the database synchronizer 530. When the database synchronizer 530 is utilized to transmit one or more status updates according to the current message transmission mode, the database update message is analogous to a status message.

When the recipient application 250 is not actively processing status updates from mobile communications device 110, the recipient application 250 removes the data record 526 from database 522. Alternatively, if the recipient application 250 is no longer executing on recipient mobile communications device 120, the recipient mobile communications device 120 may remove the data record 526 from database 522. Database 512 and database 522 are synchronized databases using database synchronizer 530 so that when data record 526 is removed from database 522 the data record 516 is also removed from database 512. When mobile communications device 110 notices that the data record 16 has been removed, it determines that the recipient application 250 is not actively processing status updates from recipient mobile communications device 120 and resumes transmitting status messages at the conservative message transmission mode.

Figure 6:
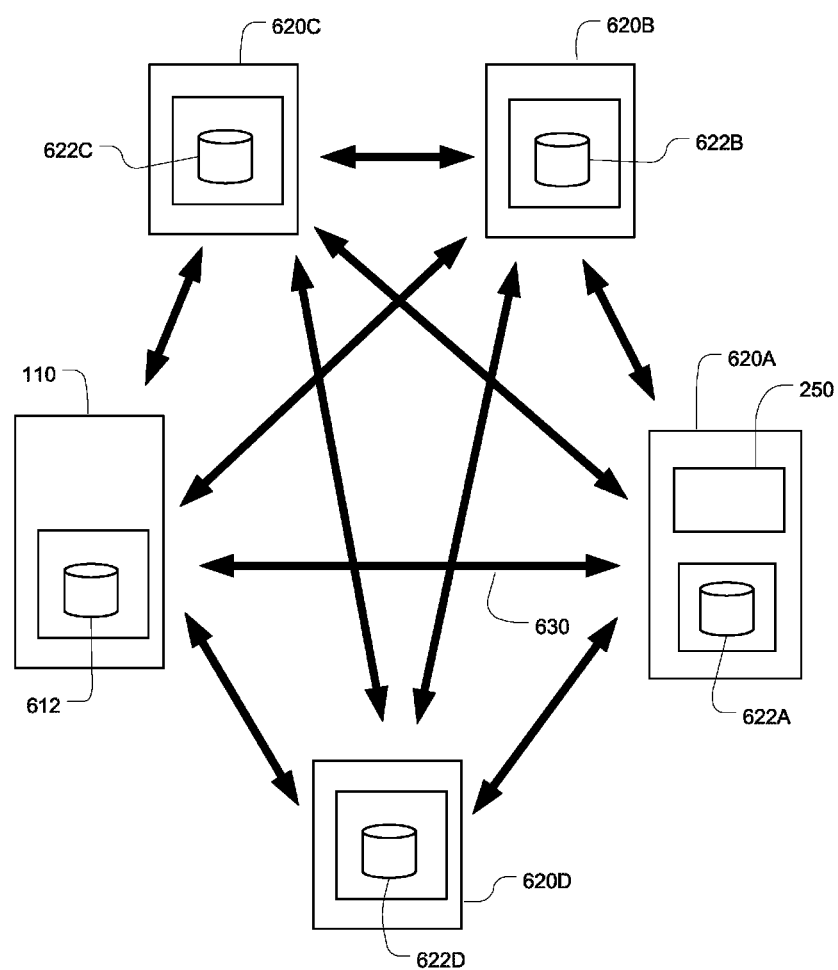
FIG. 6 is a diagram illustrating a synchronized database with a group of recipient applications in accordance with at least one of the embodiments described in this disclosure.

FIG. 6 is a diagram illustrating a an example embodiment of a system in which information concerning the processing state of a plurality or group of recipient applications is distributed using a shared, replicated, or synchronized database. The system of FIG. 6 has some similarities to that of FIG. 5 but includes a plurality or group of mobile communications devices and corresponding recipient applications. In FIG. 6, the five mobile communications devices 110, 620A, 620B, 620C and 620D are part of a group of mobile communications devices. The group of mobile communications devices may be of any size but for this example is a small static set of members or users having some relation to everyone else, e.g. family, sports team, group of friends, co-workers, small business, club or organization, various associations or relationships, etc. Each user of the group may opt-in to publish their location information from their mobile communications device to the other mobile communications devices in the group. In one implementation, each mobile communications device maintains a stored history (e.g. 24 hour location history) showing the location history of other mobile communications devices in the group. Each mobile communications device that has opted-in to publishing location information will send status messages using either a conservative message transmission mode or an accelerated message transmission mode to the other mobile communications devices. It is possible for each mobile communications device in the group to view the current or historical location of the other members of the group that have opted-in to publishing location information to the group members. For example, mobile communications device 620A may have a recipient application 250 (e.g. mapping application) that is actively processing status updates and generating an output with the current status for mobile communications device 110 and mobile communications device 620B.

In FIG. 6, five mobile communications devices 110, 620A, 620B, 620C and 620D are maintaining replicated records in synchronized databases 612, 622A, 622B, 622C and 622D, respectively. In this example, a database synchronizer 630 (similar to FIG. 5) is used to synchronize databases 12, 22A, 22B, 22C, so that all synchronized databases 612, 622A, 622B, 622C and 622D contain replicated data records and each database is completely synchronized. In another example, the database synchronizer 630 may only synchronize a portion of each database 612, 622A, 622B, 622C, and 622D so that each database has a synchronized portion that matches a synchronized portion of another database in the group. The database synchronizer 630 is used to exchange and synchronize the shared data so that the shared data is maintained at each synchronized database 612, 622A, 622B, 622C and 622D. In this example, there is no master copy controlled by a central entity but rather a copy of the shared data is maintained at each member by exchanging database update messages via the database synchronizer 630. The database synchronizer 630 may employ any of the technologies described earlier in connection with the database synchronizer 530 of FIG. 5. As a non-limiting example, database synchronizer 630, may comprise database update messages sent through a message exchange service, such as a peer-to-peer server that operates in the wireless communications network 105 to retransmit database update messages to each mobile communications device maintaining a synchronized database.

Initially, mobile communications devices 610, 620A, 620B, 620C and 620D are not using a recipient application 250 or the recipient application 250 is not actively processing status updates. In this initial state, mobile communications device 110 may transmit status messages to mobile communications devices 620A, 620B, 620C and 620D using the conservative message transmission mode. When any one of mobile communications device 620A, 620B, 620C or 620D launches a location application, the mobile communications device 620A, 620B, 620C or 620D may have a large number of location updates to display an accurate output of historical location because each status message sent using the conservative message transmission mode may comprise more than one status update measured during the delay between status messages associated with the conservative message transmission mode.

In FIG. 6, mobile communications device 620A launches a recipient application 250 that is actively processing status updates from mobile communications device 110. In this example, the recipient application 250 may be a location application that is generating an output on the display of mobile communications device 620A and is actively processing the location updates to display the current location of mobile communications device 110. The recipient application 250 may also display the historical status, such as location history of mobile communications device 110 using the previously received status updates. Because the recipient application 250 is actively processing the status updates to display the current location and there may be some delay from the last status message sent using the conservative message transmission mode, the current location of mobile communications device 110 may not be accurate until more status messages are received from mobile communications device 110. To indicate that it is actively processing status updates from mobile communications device 110, the recipient application 250 adds a record to the synchronized database 622A indicating that it is actively processing status updates from mobile communications device 110. The added record is subsequently replicated to synchronized databases 612, 622B, 622C and 622D by the database synchronizer 630.

Upon noticing the record added to database 612, mobile communications device 110 begins transmitting status messages using the accelerated message transmission mode. In one implementation, the status messages may be sent using the accelerated message transmission mode only to the recipient application 250 on mobile communications device 620A while status messages sent to the other mobile communications devices 620B, 620C and 620D continue to be sent using the conservative message transmission mode. In another implementation, when mobile communications device 110 transmits the status messages using the accelerated message transmission mode, mobile communications device 110 transmits the status messages using the accelerated message transmission mode to all of the other mobile communications devices 620A, 620B, 620C and 620D in the group.

One benefit to the embodiments of FIGS. 5 and 6 is the effective use of resources. For example, mobile communications device 110 only transmits status messages using the accelerated message transmission mode when there is a recipient application that is actively processing the status messages. During other times, mobile communications device 110 transmits status messages using the conservative message transmission mode to provide a historical status updates while conserving radio resources and reducing battery consumption. In FIGS. 5 and 6, status messages are sent directly to each recipient mobile communications device and each databases is a local database on each mobile communications device. One benefit to this example is that privacy and security concerns about the location history and current status are minimized since the status updates are not sent to a third party database and the indication that the recipient application is actively processing the status updates is not shared outside of the group.

Figure 7:
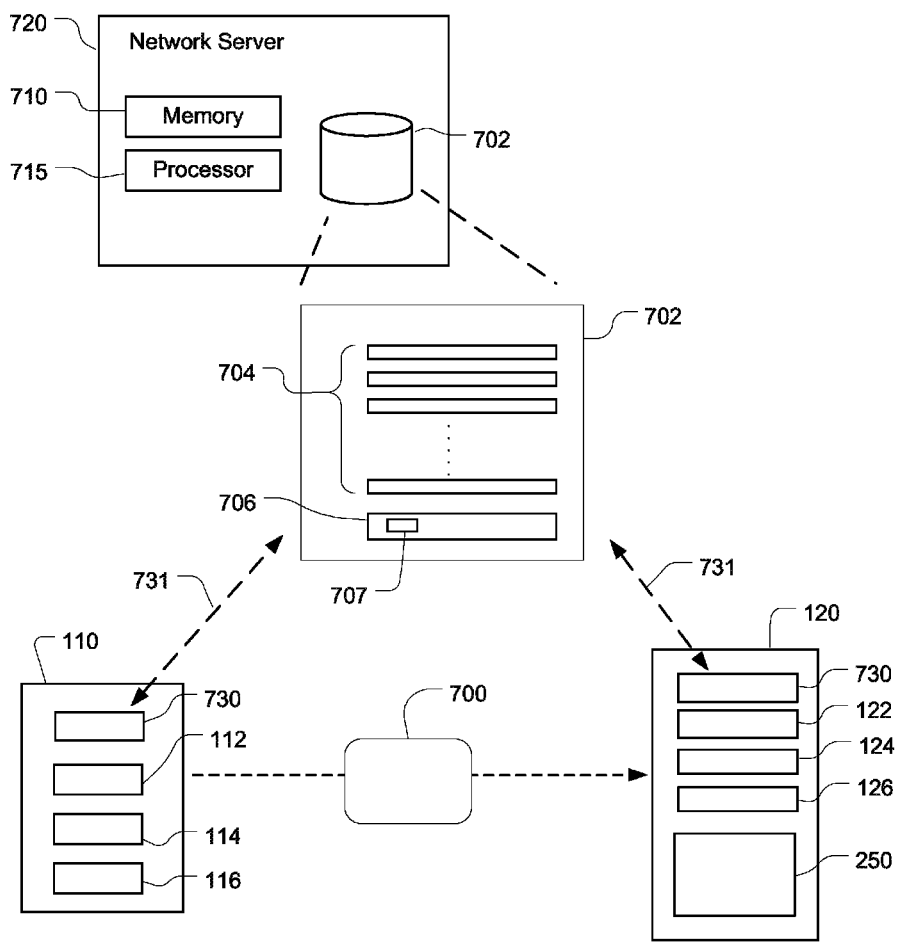
FIG. 7 is a diagram illustrating the use of a shared database in a server to determine the state of the recipient application in accordance with at least one of the embodiments described in this disclosure.

FIG. 7 is a diagram illustrating an example embodiment according to an aspect of the present disclosure in which a shared database 702 in a server 720 is employed to determine the state of the recipient application. The server 720 comprises memory 710 capable of storing a database 702. The memory 710 also stores computer readable instructions for operating a processor 715 according to this disclosure. The database 702 maintains data records, such as data records 704, 706, that are accessible by one or more mobile communications devices using database access manager 730. The one or more mobile communications devices may, for example (but without limitation) be subscribers to a service which provides them access to utilize the server 720 and database 702. The data records 704 may comprise information about the group, status updates, or configuration information regarding each subscriber or member of the group. The database access manager 730 may use or incorporate any appropriate protocol, system, program, or process (as shown by arrow 731) which allows mobile communications device 110 and recipient mobile communications device 120 to access the data records in database 702. Some examples of database access manager 730 accessing 731 data records in database 702 may include: a hypertext transfer protocol (HTTP) request and response, a SMS message used for request and response, a structured query language (SQL) command included in a message, or any network protocol used for database access from a client machine to a host database-enabled application. The database access manager 730 may initiate a connection at a regular time interval by the client, may receive a database update sent by the server 720 at a regular time interval, or may receive an irregularly transmitted message sent by the server 720 in response to a change in database 702.

Continuing with FIG. 7, recipient mobile communications device 120 launches a recipient application 250 that is actively processing status messages from mobile communications device 110. Using database access manager 730, recipient mobile communications device 120 causes a data record 706 to be added to the database 702 indicating that it is running the recipient application 250 and that the recipient application 250 is actively processing location updates from mobile communications device 110. Alternatively, the recipient application 250 may add data record 706 to database 702 using the database access manager 730. Alternatively, the server may add record 706 in response to a request from recipient application 250. Data record 706 may comprise additional information, which may include but is not limited to, a timestamp 707.

Mobile communications device 110 also uses database access manager 730 to access database 702. Upon noticing the record 706 added to database 702, mobile communications device 110 begins transmitting status messages using the accelerated message transmission mode. As in other embodiments, the status messages may be sent directly to the recipient mobile communications device 120 or to a group of mobile communications devices. In this example, mobile communications device 110 sends status messages, such as status message 700, directly to recipient mobile communications device 120.

Alternatively, mobile communications device 110 may send the status messages to database 702 using database access manager 730, where the status messages comprise data records with status updates that are added to database 702. When status updates are stored in database 702, the recipient application could be any recipient application which processes the status updates stored in the database 702, such as a server-based location application or a location running on a mobile communications device. For example, the recipient application could comprise a collector application running on server 720 and an output application running on a recipient mobile communications device 120. When the output application on recipient mobile communications device 120 is launched and actively processes status updates to generate an output, it causes an indication in database 702 to indicate that it is actively processing the status updates. Upon determining that the recipient application (output application) is actively processing the status updates, mobile communications device 110 transmits the status messages using the accelerated message transmission mode In FIG. 7, when the recipient application 250 is no longer actively processing the status updates, it causes data record 706 to be removed from the database 702. Upon noticing data record 706 is removed from the database 702, mobile communications device 110 determines that the recipient application 250 is no longer actively processing the status updates and resumes transmitting the status messages using the conservative message transmission mode.

Figure 8:
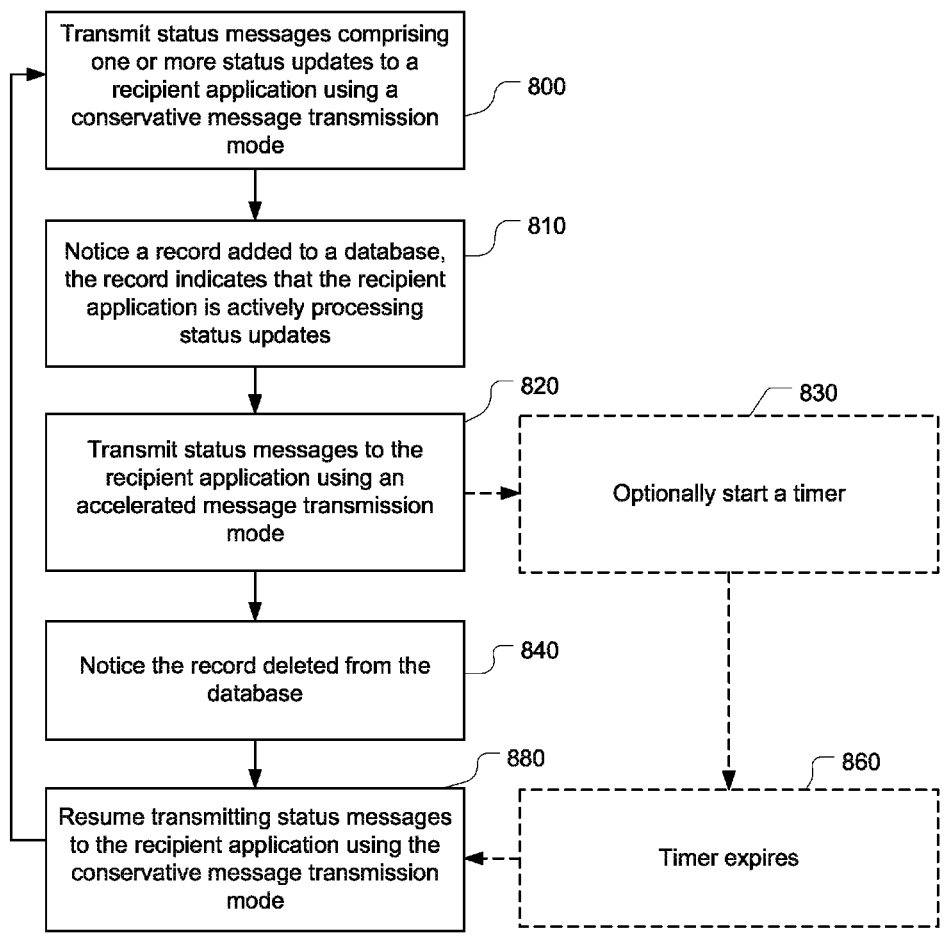
FIG. 8 is a flowchart illustrating a method of altering the message transmission mode of a mobile communications device using a record in a database to determine the state of the recipient application in accordance with at least one of the embodiments described in this disclosure.

FIG. 8 is a flowchart illustrating a an example embodiment of a method according to an aspect of the present disclosure of altering the message transmission mode of a mobile communications device using a database to determine the state of the recipient application in accordance with at least one of the embodiments described in this disclosure. The steps or operations described herein are examples. There may be many variations to these steps or operations without departing from the scope of the disclosure. For instance, where appropriate, the steps may be performed in a differing order, or steps may be added, deleted, or modified. Beginning at step 800, the mobile communications device 110 transmits status messages 100 with one or more status updates to a non-active recipient application 250 (such as, non-active recipient application 250A) using a conservative message transmission mode. At some point, recipient application 250 may begin actively processing status updates from mobile communications device 110 (such as, recipient application 250B). When the recipient application 250 begins actively processing status updates from mobile communications device, recipient application 250 or some other component of the recipient mobile communications device 120 may cause a record, such as 526 or 706 to be added to a database, such as 522 or 702. If the record 526 was added to a synchronized database 522, the database synchronizer 530 adds the corresponding data record 516 to database 512. At step 810, the mobile communications device 110 notices in a database 512, 702 that a data record 516, 706 has been added indicating that the recipient application 250 is actively processing status updates from mobile communications device 110. By noticing the data record 516, 706 in the database 512, 702, the mobile communications device 110 determines that the recipient application 250 is actively processing status updates from mobile communications device 110. When the mobile communications device 110 makes this determination, it begins transmitting status messages using the accelerated message transmission mode at step 820. At step 830, the mobile communications device 110 may optionally start a timer that will expire after a predetermined period of time. In one method, the timer is used so that when the timer expires at step 860, the mobile communications device 110 will resume transmitting status messages 100 using the conservative message transmission mode 880. The timer may also be used to cause the mobile communications device 110 to check database 512, 702 to determine if the data record 516, 706 has been altered or removed. Regardless of whether the timer has expired, if the mobile communications device 110 notices in step 840 that the data record 516, 706 is removed from the database 512, 702 (indicating that the recipient application 250 is no longer actively processing status messages), the mobile communications device will resume transmitting status messages using the conservative message transmission mode 880. The timer may be implemented using any appropriate timing arrangement, including a processor coupled with memory and appropriate program code, a logic encoded timer apparatus, an R-C circuit, or any other module of a mobile communications device capable of causing an expiration of the timer after a predetermined period of time.

Figure 9:
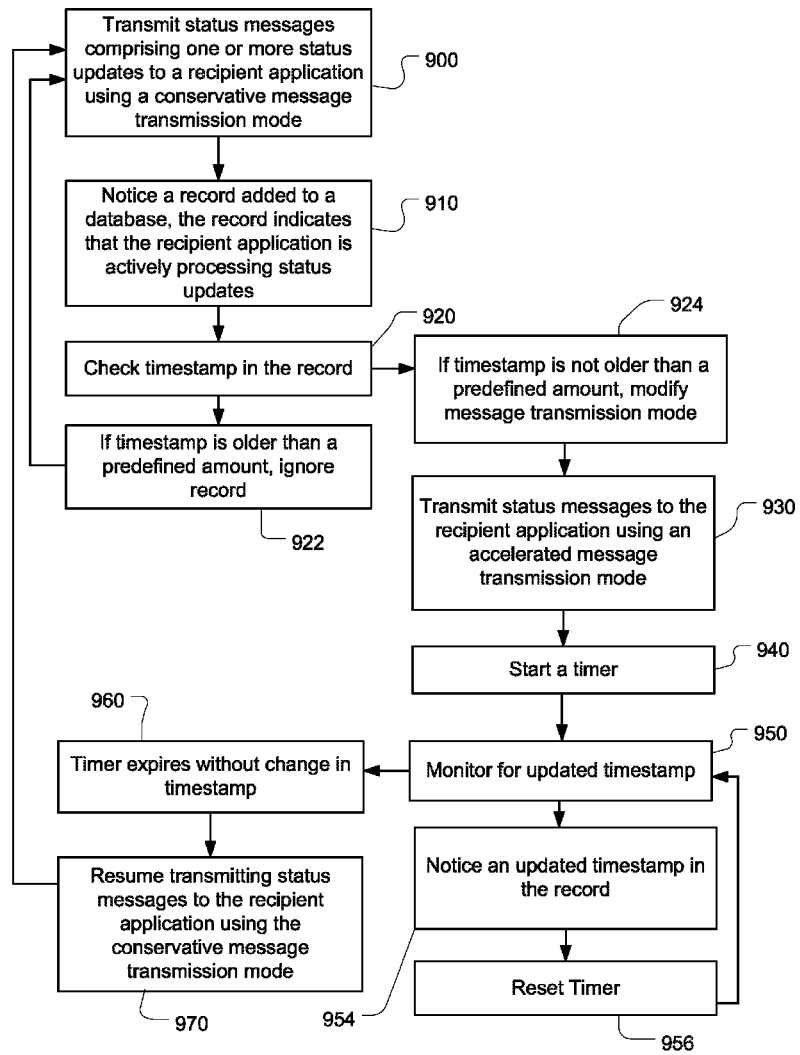
FIG. 9 is a flowchart illustrating a method of altering the message transmission mode of a mobile communications device using a record in a database in conjunction with a timestamp and timer to determine the state of the recipient application in accordance with at least one of the embodiments described in this disclosure.

FIG. 9 is a flowchart illustrating an example embodiment according to an aspect of the present disclosure of a method of altering the message transmission mode of a mobile communications device using a timestamp and timer to determine the state of the recipient application in accordance with at least one of the embodiments described in this disclosure. The steps or operations described herein are examples. There may be many variations to these steps or operations without departing from the scope of the disclosure. For instance, where appropriate, the steps may be performed in a differing order, or steps may be added, deleted, or modified. Beginning at step 900, the mobile communications device 110 transmits status messages 100 with one or more status updates to a non-active recipient application 250 (such as, non-active recipient application 250A) using the conservative message transmission mode. At some point, recipient application 250 may begin actively processing status updates from mobile communications device 110 (such as, recipient application 250B). When the recipient application 250 begins actively processing status updates from mobile communications device, recipient application 250 or some other component of the recipient mobile communications device 120 may cause a record, such as 526 or 706 to be added to a database, such as 522 or 702. If the record 526 was added to a synchronized database 522, the database synchronizer 530 adds the corresponding data record 516 to database 512. At step 910, the mobile communications device 110 notices a record 516, 706 added to a database 512, 702 indicating that the recipient application 250 is actively processing status updates from mobile communications device 110. In this embodiment, the record 516, 706 also comprises a time stamp indicating when the recipient application 250 began actively processing the status updates. At step 920, the mobile communications device 110 checks the timestamp to calculate the amount of time that has passed from the time stamp to the current time on the mobile communications device 110. At step 922, if the amount of time passed is greater than a predetermined amount or threshold, mobile communications device ignores record 516, 706 for purposes of determining that the recipient application 250 is actively processing status updates and the mobile communications device 110 continues transmitting status messages, such as status message 100 using the conservative message transmission mode. At step 924, if the amount of time passed is less than a predetermined amount of time 924, the mobile communications device 110 determines that the recipient application 250 is actively processing status updates from mobile communications device 110. At step 930, the mobile communications device 110 begins transmitting the status messages 200 using an accelerated message transmission mode. At step 940, the mobile communications device 110 begins a timer configured to expire after a predetermined period of time. At step 950, while transmitting status messages 200 using an accelerated message transmission mode, the mobile communications device 110 monitors the record 516, 706 in the database 512, 702 for any changes in the timestamp 517, 707. In this example, the recipient application 250 is aware of the predetermined time period. If the recipient application 250 is still actively processing the status messages, the recipient application 250 will modify the record 516, 706 in the database 512, 702 to update the timestamp 527,707 to a later timestamp. At step 954, the mobile communications device 110 notices that the timestamp has been updated and resets the timer at step 956. While the timer is running, the mobile communications device 110 continues transmitting status messages using the accelerated message transmission mode while monitoring for updates to the timestamp 517,707 in the record 516, 706. At step 970, if the timestamp 517,707 is not updated before the timer expires at step 960, the mobile communications device 110 resumes transmitting status messages using the conservative message transmission mode. Alternatively, if the mobile communications device notices that the record 516, 706 has been deleted from the database 512, 702, indicating that the recipient application 250 is no longer actively processing status messages, the mobile communications device 110 will resume transmitting status messages 100 using the conservative message transmission mode.

In the previous descriptions, the method used by the mobile communications device to determine that the recipient application is actively processing the status messages has been a record in a database. A person skilled in the art will appreciate that other methods are available for the mobile communications device to make this determination. For example, in some in some embodiments, the mobile communications device may receive a request message seeking more frequent status message transmissions or indicating that the recipient application is actively processing the status messages.

Figure 10:
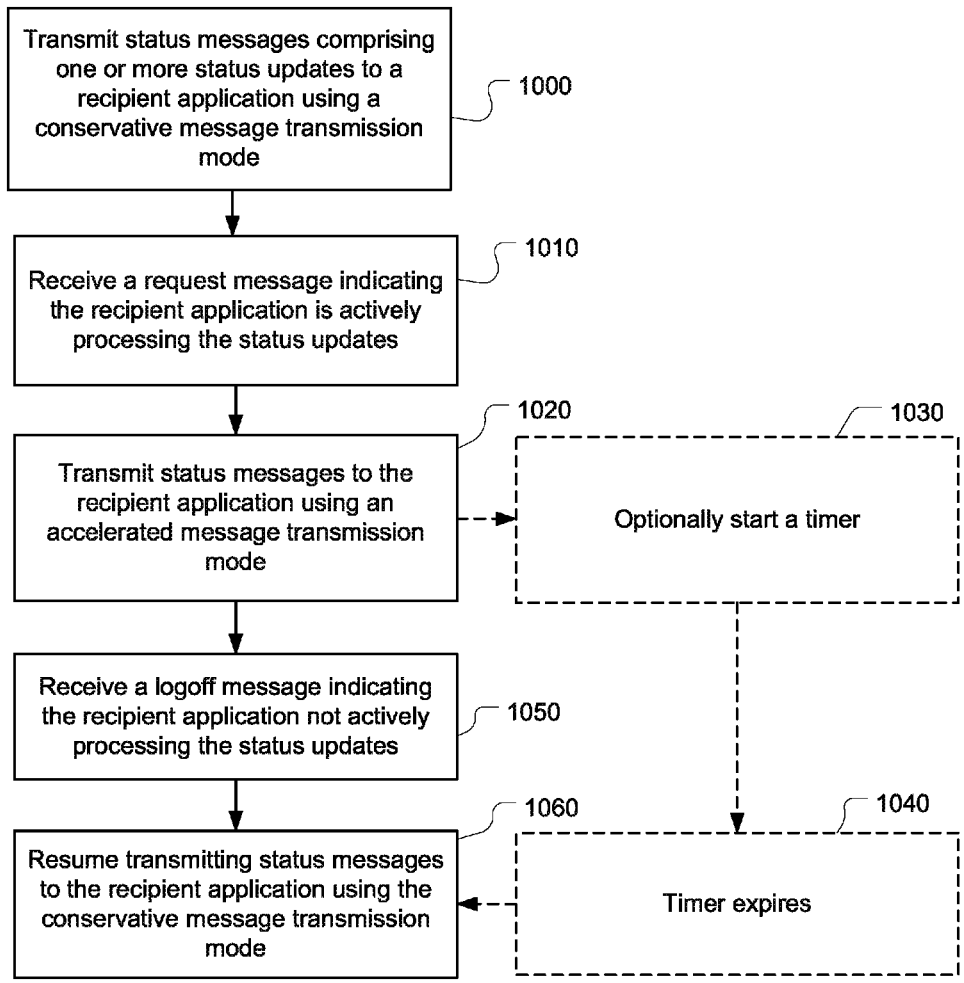
FIG. 10 is a flowchart illustrating a method of altering the message transmission mode of a mobile communications device using a request message to determine the state of the recipient application in accordance with at least one of the embodiments described in this disclosure.

FIG. 10 describes an example embodiment of a method according to an aspect of the present disclosure of a method of altering the message transmission mode of a mobile communications device using a request message to determine the state of the recipient application in accordance with at least one of the embodiments described in this disclosure. The steps or operations described herein are examples. There may be many variations to these steps or operations without departing from the scope of the disclosure. For instance, where appropriate, the steps may be performed in a differing order, or steps may be added, deleted, or modified.

Beginning at step 1000, the mobile communications device 110 transmits status messages, such as status message 100, with one or more status updates to a non-active recipient application 250 (such as, non-active recipient application 250A) using a conservative message transmission mode. At step 1010, the mobile communications device 110 receives a request message indicating that the recipient application 250 is actively processing status updates from the mobile communications device 110. The request message may be any message which bears an indication that the recipient application 250 is actively processing status updates from the mobile communications device 110. The request message may be received using any protocol, process, program, state machine, mode selector, or combination of components which allows mobile communications device 110 to receive the request message and observe the indication that the recipient application 250 is actively processing status updates from the mobile communications device 110. A request message which may be formatted to include the indication that the recipient application is actively processing status updates from mobile communications device 110 may include, for example but without limitation: an SMS message, and email message, a PIN message, a database update message, an HTTP message, an XML message, or any other message which may be received over a wireless communications network and formatted to include an indication that the recipient application is actively processing status updates from mobile communications device 110. In one example, the mobile communications device 110 receives the request message directly from the recipient application 250 or from one or more components of recipient mobile communications device 120. In other examples, the request message may be a message received from a service provider, network provider, law enforcement agency, network application, network server or from any source able to determine or indicate that the recipient application 250 is actively processing status updates from the mobile communications device 110. For example, in a system comprising the elements described with respect FIG. 7, the request message may be received from the network server 720, recipient application 250, recipient mobile communications device 120, status message processor 122, status update processor 124, any other component of the recipient mobile communications device 120, or from any component of the network server 720.

Upon receiving the request message, the mobile communications device 110 determines that the recipient application 250 is actively processing status updates from mobile communications device 110. In response to this determination, the mobile communications device 110 begins transmitting status messages 200 using the accelerated message transmission mode at step 1020. At step 1030, the mobile communications device 110 may optionally start a timer to expire after a predetermined period of time. The timer is used so that when the timer expires at step 1040, the mobile communications device 110 may resume transmitting status messages 100 using the conservative message transmission mode after a predetermined period of time at step 1060. Alternatively, if the mobile communications device 110 receives a message 1050, such as a "log-off" message, indicating that the recipient application 250 is no longer actively processing status messages, the mobile communications device 110 will resume transmitting status messages using the conservative message transmission mode 1060.

In other example embodiments of this method, the request message may comprise additional information. For example, the request message may specify a preferred message transmission mode to use for the accelerated message transmission mode. The request message may comprise an explicit request to receive status messages using the accelerated message transmission mode, a duration specifying how long the recipient application requests the accelerated message transmission mode, or a timestamp indicating when the recipient application began actively processing the status updates. If included, the timestamp may be used in a manner similar to the timestamp described in connection with FIG. 9 to decide whether to ignore the request message if the difference between the timestamp and the current time on the mobile communications device is greater than a predetermined period of time.

In some embodiments, the recipient application may realize improvements by receiving status messages transmitted using an accelerated message transmission mode when it is actively processing status updates. In other embodiments or other applications, the recipient application may realize improvements by receiving status messages transmitted using a conservative message transmission mode even when it is actively processing status updates. In this disclosure, a first message transmission mode and a second message transmission mode are different message transmission modes, one faster than the other. Each status message sent using the first message transmission mode and the second message transmission mode may have different numbers of status updates included in the status message. Determining which message transmission mode is faster than the other and the number of status updates in each status message depends on the nature and requirements of the recipient application. For the examples described in this disclosure, the accelerated message transmission mode is "faster" than the conservative message transmission mode and each status message sent using the accelerated message transmission mode includes a fewer number of status updates.

In these examples, the selection of the message transmission mode may be further modified by other factors, including without limitation: relative location of recipient application, distance from the mobile communications device to the recipient application, mobile communications networks available for the mobile communications device to transmit status messages, relative movement of the mobile communications device, battery power on the mobile communications device, priority indications associated with the recipient application, or other activities being conducted at the mobile communications device.

Figure 11:
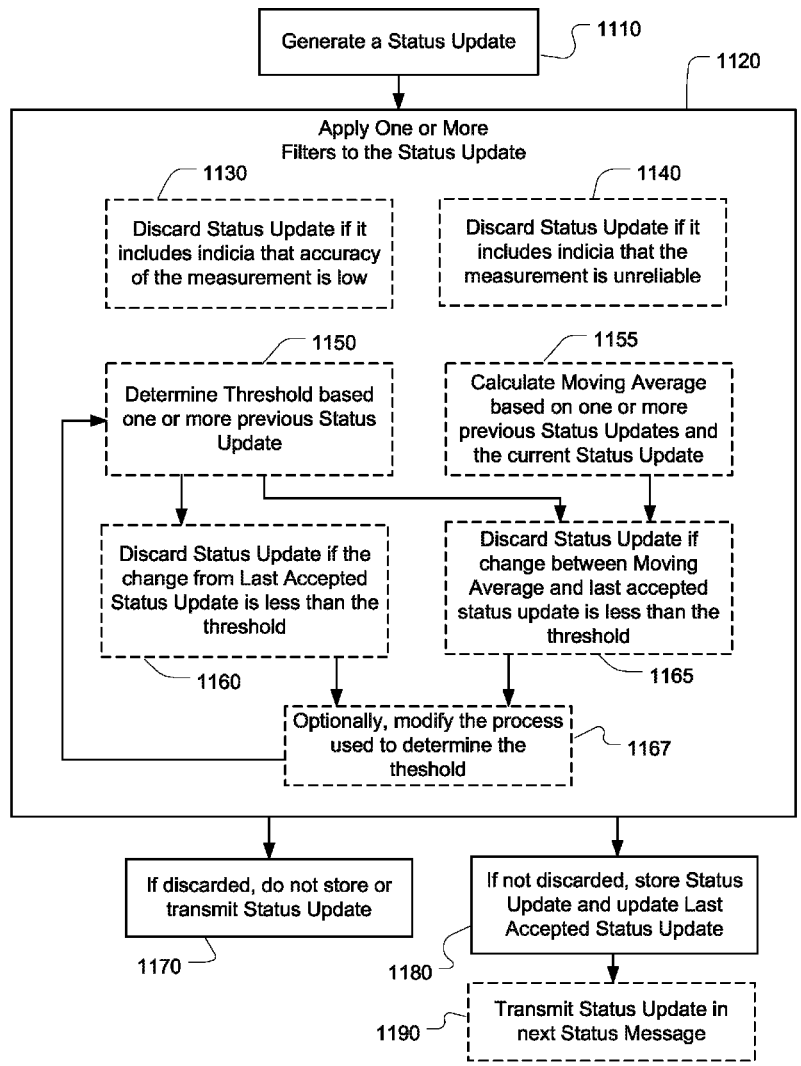
FIG. 11 is a flowchart illustrating a method executed in a mobile communications device for filtering status updates to be sent by the mobile communications device in accordance with at least one of the embodiments described in this disclosure.

FIG. 11 is a flowchart illustrating an example embodiment of a method according to an aspect of the present disclosure for filtering status updates to be sent by the mobile communications device. The steps or operations described herein are examples. There may be many variations to these steps or operations without departing from the scope of this disclosure. For instance, where appropriate, the steps may be performed in a differing order, or steps may be added, deleted, or modified. The method may reduce the number of status updates provided to an application by applying algorithm-based filters based on the expected usage by the application. This may be used for status updates transmitted over a wireless network to a recipient application, and may also be used for status updates used by a local application running on the mobile communications device which generates the status updates.

In an example embodiment in which the method of FIG. 11 may be implemented, the mobile communications device 110 comprises a location module or data module which is able to generate status updates. Sometimes the location module or data module may generate a status update that is erroneous or unnecessary. For example, a location module using GPS may generate erroneous measurements when indoors or in poor GPS coverage areas. In some location modules the location module may generate many different measurements of the current location even when the mobile communications device is stationary in a single actual location. In such cases, the mobile communications device is said to be "loitering" in one location. The algorithm-based filters described in this disclosure may be used, for example, to detect loitering, and to reduce the number of the status updates generated into fewer status updates representing the actual location of the device during times when the device is loitering.

In step 1110, mobile communications device 110 generates a status update using a location module or data module in the mobile communications device. The status update is sent to a filter module which applies one or more members of a group 1120 of filtering steps (described further in greater detail) used to reduce status updates. The filter module may be implemented using the processor and memory of the mobile communications device, or may be logic encoded in a filter apparatus in the mobile communications device. These filters are described in more detail below. If the status update is not discarded by any of the filters implemented in group 1120, the mobile communications device 110 stores the status update in the memory of the mobile communications device 110 and updates a portion of the memory used to store the last accepted status update in step 1180. The last accepted status update is used as a variable input for some of the filters which may be applied in any filter steps in group 1120. At step 1190, the mobile communications device 110 may optionally transmit the status update as part of a status message sent according to other embodiments in this disclosure. If the status update is discarded by any filter step in group 1120, then the status update is not stored or transmitted 1170 and is otherwise not used by the mobile communications device 110.

This disclosure describes as non-limiting examples four separate filters, and group 1120 may comprise one or more of these filters, which may be applied individually or in combination with each other. Although the filtering steps of group 1120 are shown in FIG. 11 as elements of a method, which might be implemented for example in a software-controlled computer system, one of skill in the art will appreciate that the filters could also be implemented using any other suitable filtering arrangement, including for example, appropriate digital filter circuits or other appropriate hardware. Although the filtering steps are described and shown in a particular order, the filters may be implemented in a different order.

A first filter may be implemented by filtering step 1130, where the status update is discarded if it includes indicia that accuracy of the measurement is low. For example, the location module or data module may provide a status update which comprises a measurement and an indication of the accuracy of the measurement. If the indication of the accuracy is below a threshold, the status update is discarded in step 1130. In some embodiments, the status update may comprise a soft decision value where the accuracy of the status update is reflected by the magnitude of the measurement in the soft decision value.

A second filter may be implemented by filtering step 1140, where the status update is discarded if it includes indicia that the measurement is unreliable. For example, the location module or data module may provide a status update which comprises a measurement and the number of inputs used to calculate the measurement. In the example of a location module comprising a GPS receiver, the GPS receiver may report the number of satellite signals used to determine the location measurement. If the number of inputs used to calculate the measurement is below a predetermined threshold, the status update is said to include indicia that the measurement is unreliable. In step 1140, the filter discards the status update based on the indicia that the measurement is unreliable.

A third filter may be implemented by filtering steps 1150 and 1160. In step 1150, the mobile communications device 110 determines a threshold based on one or more previous status updates. This determination could be based on calculation using a mathematical function associated with the measurement data in the status update or may be based on a predetermined threshold associated with the measurement data. The threshold may be determined based on one or more previous status updates. The threshold is a variable value that may be determined by the filter module during filtering of each status update or may be determined periodically and used as a threshold for filtering several status updates. In step 1160, the mobile communications device calculates the difference between the status update and the last accepted status update. If it is below the threshold, the status update is discarded. For example, if the current status update represents a location less than 50 meters distance from the last accepted status update, the current status update may be discarded. In a variation to step 1160, the threshold may represent a maximum change allowed and the status update may be discarded if the status update is more than a threshold. In a further variation, there may be separate thresholds representing minimum and maximum changes, and the status update may be discarded if it is less than the minimum threshold or more than the maximum threshold.

A fourth filter may be implemented by filtering steps 1150, 1155, 1165. At step 1150 the threshold is determined based on one or more previous status updates. At step 1155, the filter module calculates a moving average based on one or more previous status updates and the current status update. The moving average is an average of the measurements associated with the one or more previous status updates. At step 1165, the moving average is compared with the last accepted status update and if the difference is less than the threshold determined by step 1150, the current status update is discarded. At optional step 1167, the filter module may modify the process used to determine the threshold in step 1150. As described below, the optional modification 1167 of the threshold allows for a changing threshold so that the filter module may discard status updates when they are unnecessary for the accuracy of recipient application or local application.

The threshold determined in step 1150 and the optional modification to the threshold in step 1167 may be used for both the third and fourth filter described in this disclosure. Step 1150 and 1167 may be implemented in a threshold determination module as part of the filter module. Using the example of a location update, the threshold may be a distance threshold. In a simple example the threshold may be a predetermined value, such as 50 meters distance from the last accepted status update. In another example, the threshold may be calculated in a threshold determination module implementing a mathematical function applied to the previous status update or status updates. At optional step 1167, the filter module may modify the process used to determine the threshold in step 1150. For example, if multiple consecutive status updates have been discarded by operation of step 1160 or step 1165, then the threshold may be increased. Using a location update as an example, if 10 location updates have been discarded because they are less than 50 meters distance from the last accepted status updated, the threshold may increase to 150 meters. By increasing the radius, the filter module will discard status updates that represent measurements when a mobile communications device is generally stationary at a location (e.g. loitering). Therefore if a certain number of status updates include measurements within a certain radius of the last accepted status update and are observed consecutively, then the radius is increased in size periodically up to a predetermined maximum threshold radius, such as 250 meters. In this example, the changing threshold provides "stickiness" associated with the last accepted status update if the device is in one place for a long period of time. By filtering and discarding status updates using this changing threshold, the mobile communications device 110 reduces the number of status updates that must be sent in a status message used by a recipient application or the number of status updates that must be processed by a local application.

Figure 12:
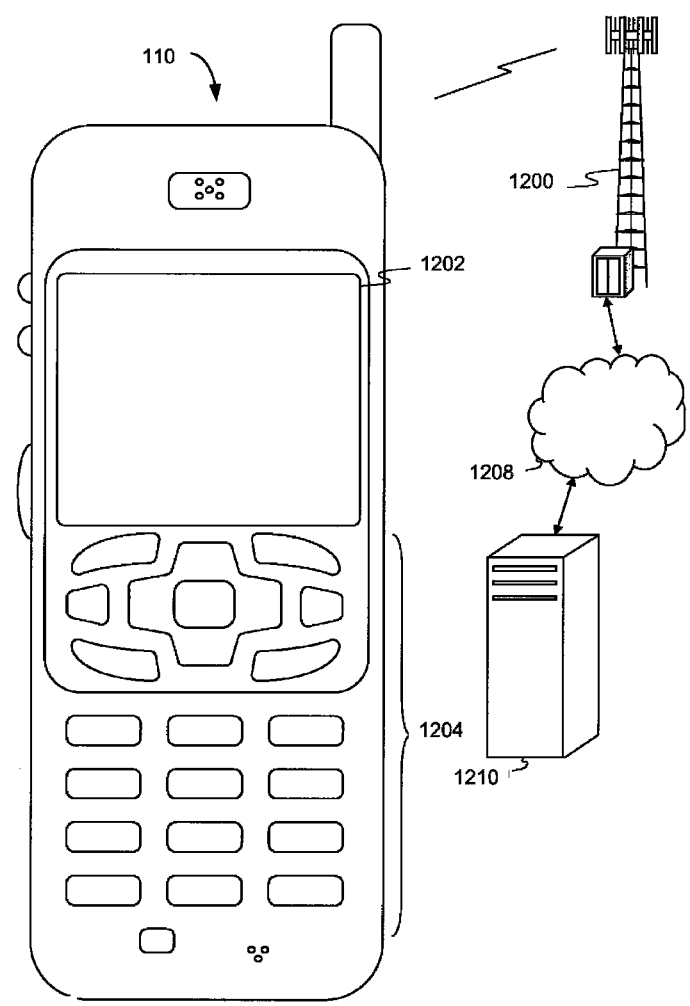
FIG. 12 illustrates a wireless communications system including an embodiment of a mobile communications device in accordance with at least one of the embodiments described in this disclosure.

FIG. 12 illustrates an example embodiment of a wireless communications system according to an aspect of the present disclosure, including an example embodiment of a mobile communications device 110. The mobile communications device 110 is operable for implementing aspects of the disclosure, but the disclosure should not be limited to these implementations. Modern mobile communications devices continue to benefit from improvements in processor design, memory, battery solutions, manufacturing processes, and software design. Mobile communications devices may have a variety of sizes, shapes, and features. For example, a mobile communications device 110 may be (or be a part of) a smart phone, wireless router, relay, laptop computer, tablet computer, GPS-enabled device, Navigation System, wireless mobile tracking device or any other device which may transmit information via a wireless network 1200.

The mobile communications device 110 may include a display 1202. The mobile communications device 110 may also include a touch-sensitive surface, a keyboard or other input keys generally referred as 1204 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The mobile communications device 110 may present options for the user to select, controls for the user to actuate, and/or cursors or other indicators for the user to direct.

The mobile communications device 110 may further accept data entry from the user, including numbers to dial or various parameter values for configuring the operation of the mobile communications device 110. The mobile communications device 110 may further execute one or more software or firmware applications in response to user commands. These applications may configure the mobile communications device 110 to perform various customized functions in response to user interaction. Additionally, the mobile communications device 110 may be programmed and/or configured over-the-air, for example from a wireless base station, a wireless access point, or a peer mobile communications device 110.

Among the various applications executable by the mobile communications device 110 is, for example, a web browser, which enables the display 1202 to show a web page. The web page may be obtained via wireless communications with a wireless network access node, a cell tower, a peer mobile communications device 110, or any other wireless communication network or system 1200. The network 1200 may be coupled to a wired network 1208, such as the Internet. Via the wireless link and the wired network, the mobile communications device 110 can have access to information on various servers, such as a server 1210. The server 1210 may provide content that may be shown on the display 1202. Alternately, the mobile communications device 110 may access the network 1200 through a peer mobile communications device 110 acting as an intermediary, in a relay type or hop type of connection. A mobile communications device 110 may be operable to transmit over one or more of any suitable wireless networks 1200, including but not limited to Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX), IEEE 802.11a, 802.11b and/or 802.11g (also referred to as wireless local area network, "Wi-Fi" or "WLAN"), 3GPP Long Term Evolution (LTE), satellite communications and/or other wireless networks.

The mobile communications device 110 and other components described above may include a processing component that is capable of executing instructions related to the actions described above. FIG. 13 illustrates an example embodiment of a system 1300 that includes a processing component 1310 suitable for implementing one or more of the embodiments earlier described herein. In addition to the processor 1310 (which may be referred to as a central processor unit or CPU), the system 1300 may include network connectivity devices 1320, random access memory (RAM) 1330, read only memory (ROM) 1340, secondary storage 1350, and input/output (I/O) devices 1360, location module 1390, data module 1395, filter module 1355. These components may communicate with one another via a bus 1370. In some cases, some of these components may not be present or may be combined in various combinations with one another or with other components not shown. These components may be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380, is shown as a separate component, the DSP 1380 may be incorporated into the processor 1310. Although the recipient callback module 1345, filter module 1355, location module 1390, and data module 1395 are shown as separate components, any of them may be incorporated into the processor 1310 or may be implemented using one or more components shown in FIG. 13.

In some embodiments of the mobile communications device 110, the location module 1390 comprises a location determination system and obtains the location data to be used in a status update. The location determination system, in some embodiments comprises a GPS (Global Positioning System) receiver. The location determination, in some embodiments, may further comprise a processor for calculated location based on data received from the GPS receiver or any other device or system that provides location data to the mobile communications device 110. In other embodiments, the location determination system is a system that calculates location based on triangulation of radio signals or determination of the radio transmission path length or range, or some proxy therefore, of signals from several transmitters (e.g., LORAN). Other location determination systems include GLONASS and Galileo.

In some embodiments of the mobile communications device 110, the data module 1395 comprises a data acquisition system and obtains measurement data to be used in a status update. The data acquisition system, in some embodiments comprises a sensor and measurement processor. The data acquisition system, in some embodiments, may further comprise a processor for calculated measurements based on data received from the sensor or any other device or system that provides measurement data to the mobile communications device 110. In other embodiments, the data acquisition system is a system that utilizes other components of the mobile communications device 110 to acquire measurement data, such as a USB, Bluetooth, or serial device connected by a network connectivity device 1320.

The processor 1310 executes instructions, logic, codes, computer programs, or scripts that it may access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may, for example, be implemented as one or more CPU chips or modules. The processor 1310 may also be integrated with other functions of mobile communications device 110 in or on a single chip or module.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that in some cases has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. However, the secondary storage 1350 could be implemented using any appropriate storage technology, including so-called "solid state disk," FLASH, EEPROM, or other generally non-volatile or persistent storage. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the mobile communications device 110, such as the display 1202 and the input 1204.

A person skilled in the art will appreciate that the embodiments described herein may be modified without departing from the scope of the present disclosure. For example, in some embodiments, the conservative message transmission mode and accelerated message transmission mode and associated settings may be preconfigured on mobile communications device. While the embodiments described herein include a mobile communications device utilizing two message transmission modes, a person skilled in the art will appreciate that multiple message transmission modes may be used, such as a decaying message transmission mode that is used after transmitting using the accelerated message transmission mode, but before returning to the conservative message transmission mode. The mobile communications device may utilize a priority indication in the data record to select from a variety of message transmission modes depending on the level of delay acceptable to the recipient application that is actively processing the status updates.

Thus, there has been described herein methods and apparatus for selecting and modifying the transmission rates and sizes of status update messages transmitted by a mobile communications device to a recipient application. In one embodiment, a method in a mobile communications device for transmitting status messages to a recipient application uses a conservative message transmission mode, wherein each status message comprises one or more status updates, and upon determining that the recipient application is actively processing the status updates, transmits status messages using an accelerated message transmission mode. In a further described embodiment, the status messages transmitted using the accelerated message transmission mode have less delay between status messages than the status messages transmitted using the conservative message transmission mode.

In connection with another embodiment, the present disclosure describes a method for determining that the recipient application is no longer actively processing the status updates, and then resuming transmitting status messages using the conservative message transmission mode.

In yet a further embodiment, the present disclosure describes a method for resuming transmitting status messages using the conservative message transmission mode after a predetermined period of time unless the mobile communications device makes a subsequent determination that the recipient application is still actively processing the status updates during the predetermined period of time.

In one embodiment, the mobile communications device determines that the recipient application is actively processing the status updates by monitoring a database for a record in the database, wherein the record comprises an indication that the recipient application is actively processing the status updates. In variations of this embodiment, the database may be a synchronized database stored in the memory of the mobile communications device or may be shared database stored in a network server.

In one example of this embodiment, when the record is removed from the database, the mobile communications device determines that the recipient application is no longer actively processing the status updates and then resumes transmitting status messages using the conservative message transmission mode.

In a further example of this embodiment, the present disclosure describes a method wherein the record further comprises a timestamp indicating when the recipient application began actively processing the status updates. In this example, the mobile communications device may compare a current time on the mobile communications device with the timestamp, and if the difference between the current time and the timestamp is greater than a predetermined period of time, the mobile communications device may ignore the record for purposes of determining that the recipient application is actively processing the status updates. In this example, if the timestamp in the record is updated during the time when the mobile communications device is transmitting status messages using the accelerated message transmission mode, then the mobile communications device continues transmitting the status messages using the accelerated message transmission mode until the expiration of the predetermined time period after the updated timestamp.

In another embodiment, the mobile communications device determines that the recipient application is actively processing the status updates by receiving a request message from the recipient application comprising at least one of an indication that the recipient application is actively processing the status updates or an explicit request to receive status messages using the accelerated message transmission mode. Optionally, the request message may comprise a duration specifying how long the recipient application desires to received status messages using the accelerated message transmission mode.

In one example of this embodiment, the request message may further comprise a timestamp indicating when the recipient application began actively processing the status updates. In this example, the mobile communications device may compare a current time on the mobile communications device with the timestamp, and if the difference between the current time and the timestamp is greater than a predetermined period of time, then the mobile communications device may ignore the request message for purposes of determining that the recipient application is actively processing the status updates.

In a further embodiment of this disclosure, each status update comprises location data of the mobile communications device and each status update may be generated at a predetermined status update interval.

In a further embodiment of this disclosure, the recipient application that is actively processing the status updates is a location application.

In a further embodiment of this disclosure, the recipient is a second mobile communications device.

In a variation of the foregoing embodiments, each status message transmitted using the conservative message transmission mode comprises a batch of status updates comprising two or more status updates, and each status message transmitted using the accelerated message transmission mode comprises a single status update.

Further, embodiments described herein may be implemented in conjunction with a mobile communications device, comprising a transceiver, memory, one or more processors, computer instructions stored in the memory, the computer instructions being executable by the one or more processors for implementing any of the methods described in this disclosure.

Embodiments described herein may be realized as a computer program product, comprising a computer readable medium, computer instructions stored on the computer readable medium, the computer instructions being executable by one or more processors in a mobile communications device for implementing any of the methods described in this disclosure.

Further, some embodiments may employ a method and apparatus for filtering a status update based on a comparison of a last accepted status update and a comparison value based on a current status update when the comparison value is less than a determined threshold. The determined threshold is based on one or more previous status updates. In some embodiments, the determined threshold is increased if each previous comparison value associated with each of a predetermined number of previous status updates is less than the minimum threshold. In one embodiment, the comparison value is calculated and represents the difference between the last accepted status update and the current status update. In another embodiment, the comparison value is calculated and represents the difference between the last accepted status update and an average calculated with the current status update and a plurality of previous status updates.

Although example embodiments of this disclosure have been depicted and described in detail herein, it will be apparent to those skilled in the relevant art that various modifications, additions, substitutions, and the like can be made without departing from the concepts and embodiments disclosed herein, and these are therefore considered to be within the scope of the present subject matter as defined in the following claims.

What is claimed is:

1. A method in a mobile communications device that transmits status messages to a recipient application, each status message including at least one status update, the method comprising:
transmitting status messages using a first message transmission mode; and
upon determining that the recipient application is actively processing status updates, transmitting status messages using a second message transmission mode, the second message transmission mode being different from the first message transmission mode.

2. The method of claim 1, further comprising:
upon determining that the recipient application is no longer actively processing status updates, resuming transmitting status messages using the first message transmission mode.

3. The method of claim 1, further comprising:
resuming transmitting status messages using the first message transmission mode after a period of time unless the mobile communications device makes a subsequent determination that the recipient application is actively processing status updates during the period of time.

4. The method of claim 1, wherein when the mobile communications device is transmitting status messages using the second message transmission mode, the mobile communications device transmits status messages with less delay than when the mobile communications device is transmitting status messages using the first message transmission mode.

5. The method of claim 1 wherein determining that the recipient application is actively processing status updates comprises monitoring a database for a record in the database, wherein the record comprises an indication that the recipient application is actively processing status updates.

6. The method of claim 5 wherein the record further comprises a duration specifying how long the mobile communications device should transmit status messages using the second message transmission mode.

7. The method of claim 5 further comprising:
determining that the record was removed in the database; and
resuming transmitting status messages using the first message transmission mode.

8. The method of claim 5 wherein the record further comprises a timestamp indicating when the recipient application began actively processing status updates, the method further comprising:
comparing a current time on the mobile communications device with the timestamp, and if the difference between the current time and the timestamp is greater than a predetermined time period, ignoring the record for purposes of determining that the recipient application is actively processing status updates.

9. The method of claim 5 wherein the database comprises a shared database in a networked server.

10. The method of claim 1 wherein determining that the recipient application is actively processing status updates comprises:
receiving a request message from the recipient application comprising at least one of an indication that the recipient application is actively processing status updates or an explicit request to receive status messages using the second message transmission mode.

11. The method of claim 10 wherein the request message further comprises a duration specifying how long the recipient application requests to received status messages using the second message transmission mode.

12. The method of claims 10 wherein the request message further comprises a timestamp indicating when the recipient application began actively processing status updates.

13. The method of claims 12 further comprising:
comparing a current time on the mobile communications device with the timestamp, and if the difference between the current time and the timestamp is greater than a predetermined time period, then ignoring the request message for purposes of determining that the recipient application is actively processing status updates.

14. The method of claim 1 wherein:
when the mobile communications device is transmitting status messages using the first transmission mode, each status message includes more than one status update; and
when the mobile communications device is transmitting status messages using the second message transmission mode, each status message includes one status update.

15. A mobile communications device, comprising:
a mode selector configured to determine whether a recipient application is actively processing status updates and to select a message transmission mode based on whether the recipient application is actively processing status updates; and a message generator configured to generate status messages and to cause transmission of status messages from the mobile communications device to a recipient application using the selected message transmission mode.

16. The mobile communications device of claim 15, wherein the mode selector is configured to select a second message transmission mode when the mode selector determines that the recipient application is actively processing status updates, and the mode selector is configured to select a first message transmission mode when the mode selector determines that the recipient application is not actively processing status updates.

17. The mobile communications device of claim 15, wherein the mode selector comprises a component to observe a local database for a record in the database, the record comprising an indication that the recipient application is actively processing status updates.

18. The mobile communications device of claim 15, wherein the mode selector comprises a component to inspect a request message from the recipient application, the request message including an indication that the recipient application is actively processing status updates.

* * * * *